July 21, 1953

R. P. GRIGSBY 2,646,288

WAGON HITCH WITH AUTOMATIC UNIT
AND LEVER RELEASING GEAR

Filed Jan. 2, 1951

Raymond P. Grigsby
INVENTOR.

BY *Clarence A. O'Brien
and Harvey B. Jacobson*
Attorneys

July 21, 1953  R. P. GRIGSBY  2,646,288
WAGON HITCH WITH AUTOMATIC UNIT
AND LEVER RELEASING GEAR
Filed Jan. 2, 1951  2 Sheets-Sheet 2
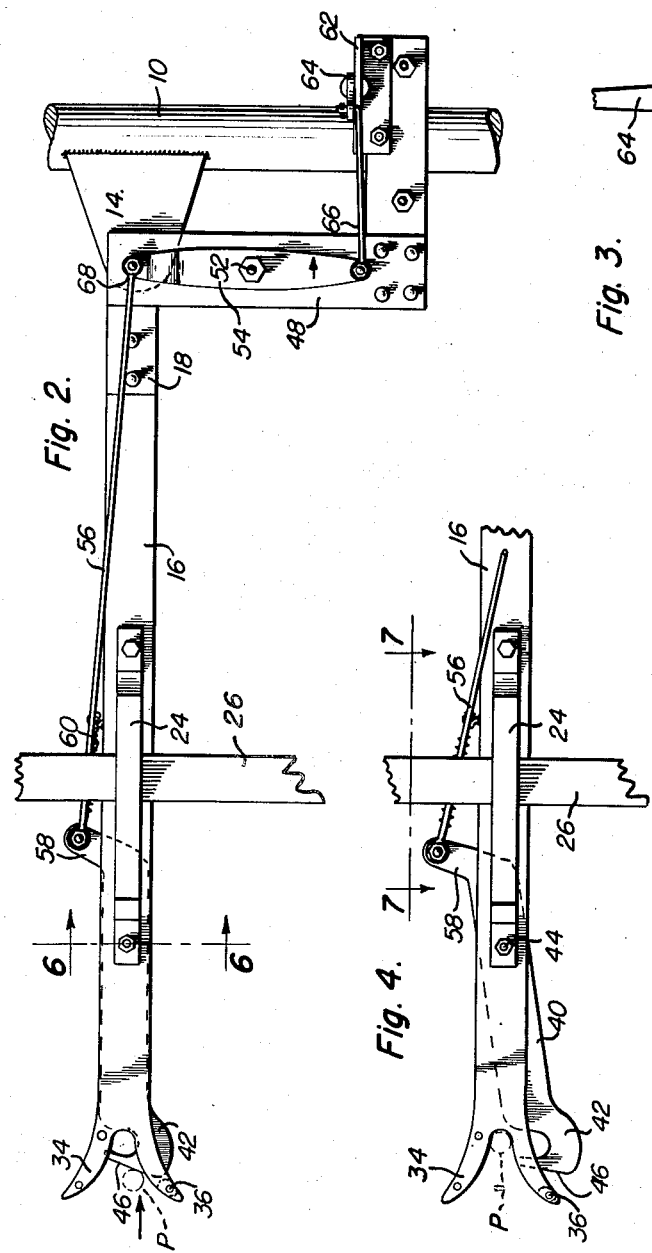
Raymond P. Grigsby
INVENTOR.
BY *Clarence A. O'Brien
and Harvey B. Jacobson*
Attorneys Patented July 21, 1953

2,646,288

UNITED STATES PATENT OFFICE 2,646,288

WAGON HITCH WITH AUTOMATIC UNIT AND LEVER RELEASING GEAR

Raymond P. Grigsby, Aurora, Nebr.

Application January 2, 1951, Serial No. 203,855

3 Claims. (Cl. 280—33.15)

1

This invention relates to new and useful improvements in coupling devices and the primary object of the present invention is to provide a coupling unit whereby a wagon hitch may be automatically coupled to a corn picker as the picker is backed to the wagon.

Another important object of the present invention is to provide a wagon hitch including a pin seat and a spring urged cam surfaced hook that extends across the seat and which hook is moved by a pin away from the seat until the pin has cleared the hook whereupon the hook will snap behind the pin to lock the same in the seat.

A further object of the present invention is to provide a wagon hitch and coupling of the aforementioned character including a lever that is manually actuatable by the driver of the corn picker to permit the hook to release the pin for uncoupling the picker and wagon drawn thereby.

A still further aim of the present invention is to provide a wagon hitch with automatic unit and lever releasing gear that is simple and practical in construction, and which is quickly and readily applied to or removed from a wagon and corn picker in a convenient manner.

Other objects and advantages reside in the details of construction and operation as more fully hereinafter described and claimed, reference being had to the accompanying drawings forming part hereof, wherein like numerals refer to like parts throughout, and in which:

Figure 2 is a top plan view of the present invention attached to a picker frame and receiving a wagon hitch pin;

Figure 3 is a side view of Figure 2;

Figure 4 is a view similar to Figure 2 but showing the hook member in its released position;

Figure 1:
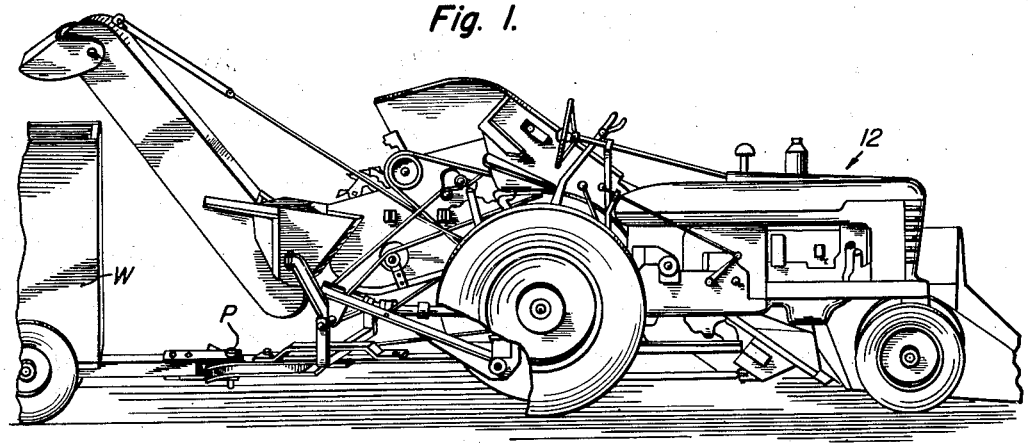
Figure 1 is a side elevational view of a corn picker and wagon coupled thereto through use of the present invention.
Figure 5:
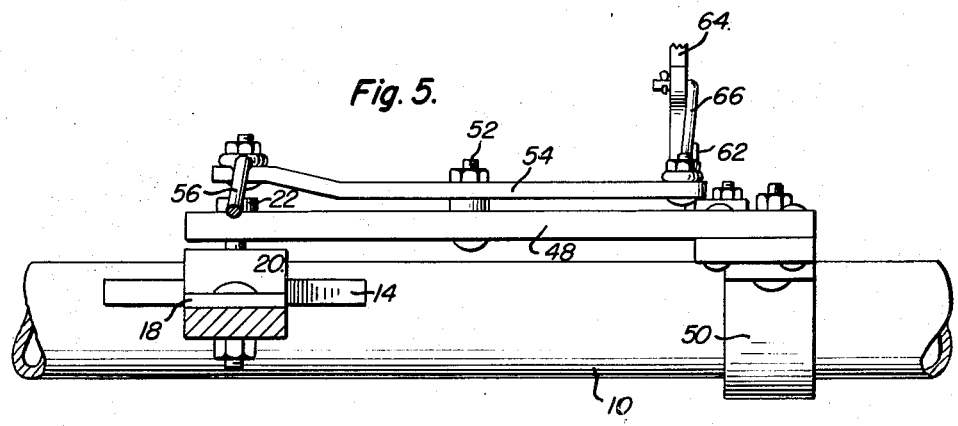
Figure 5 is an enlarged transverse vertical sectional view taken substantially on the plane of section line 5—5 of Figure 3.
Figure 6:
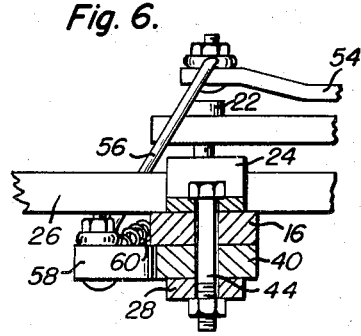
Figure 6 is an enlarged transverse vertical sectional view taken substantially on the plane of section line 6—6 of Figure 2.
Figure 7:
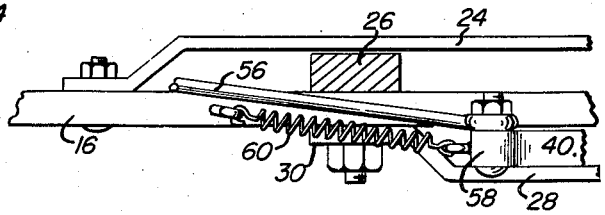
Figure 7 is an enlarged detail sectional view taken substantially on the plane of section line 7—7 of Figure 4.

Referring now to the drawings in detail, wherein for the purpose of illustration, there is disclosed a preferred embodiment of the present invention, the numeral 10 represents a transverse portion of a corn picker 12 having a rear-

2 wardly projecting tongue 14 that overlies the forward end of a draw bar 16.

A plate 18 is suitably fixed on the rear end of the bar 16 and includes a forward offset 20 that coacts with the forward end of the bar 16 in defining a channel in which the tongue 14 is reserved. A coupling pin 22 extends downwardly through the offset 20 and the bar 16 as well as the tongue 14 to pivotally secure the draw bar and tongue together.

The outwardly turned ends of an elongated channel bracket 24 are secured to the bar 16 and this bracket embraces the sliding draw bar 26. The rear offset end 28 of an elongated plate 30 is secured beneath the rear end of the draw bar 16 and terminates in a V-shaped end 32 that underlies a V-shaped seat 34 at the rear end of the bar 16. The seat 34 and end 32 are secured together by rivets or the like 36 and spacers 38 surround the rivets 36 and are positioned between the seat 34 and end 32.

The shank portion 40 of a hook member 42 is pivoted for horizontal swinging movement between the bar 16 and the offset 28 by a pivot 44 that extends vertically through one out-turned end of the bracket 24, the bar 16, and the offset 28. The hook member 42 is provided with a cam surface 46 that normally extends across the seat 34 and end 32 to block the retraction of a pin therefrom.

One end of a substantially L-shaped arm 48 is secured to the tongue 14 of the offset 20 and the bar 16 by the pin 22. The other end of the arm 48 supports a U-shaped clamp 50 that embraces the frame member 10. The arm 48 carries a vertical pivot 52 that extends through the central portion of a horizontally swingable arm or member 54.

A pitman 56 is terminally pivoted to one end of the member 54 and to an ear 58 on the shank portion 40. A spring 60 connects the ear 58 to the bar 16 and retains the hook member across the portions 32, 34 as shown in Figure 2. The arm 48 supports an angle bracket 62 to which there is pivoted a vertically swingable lever 64. The lever 64 is connected to the other end of the member 54 by a pitman or link 66 so that the hook member 42 may be manually moved away from portions 32, 34.

In practical use of the present invention, as the hitch pin P of a wagon W enters the seat 34 and end 32, the hitch pin rides against the cam surface 46 of hook member 42 to urge the hook member away from the seat 34 and end 32 until the pin has cleared the hook, whereupon the hook snaps behind the pin to lock the pin and bar 16 together.

To release the pin, the lever 64 is manually forced forwardly to shift the link 56 rearwardly, thereby swinging the hook 42 away from the seat 34 and end 32.

The pivot 68 securing the forward end of the link 56 to the member 54 overlies the pin 22, hence the present hitch may operate regardless of the position of the wagon, for example when the tractor is in a left turn the hitch will have traveled to the very left of the frame of the machine swinging from the pivot 22.

When the conventional hitch is used, it is necessary, when it is desired to attach the wagon to the picker, for one man to hold the wagon tongue and direct the tractor driver in backing to the wagon tongue so that a pin may be dropped into the hole in the hitch and that in the tongue as they coincide. During this operation, the tractor driver is prevented from seeing where he is backing as the corn picker with its elevator extending behind the tractor and over the hitch obscures the view and he must rely entirely on hearing the directions given by the man underneath guiding the wagon tongue.

Such a dangerous and unsatisfactory procedure is avoided with the present hitch and coupling inasmuch as the pin will be guided into the V-seat and automatically locked in place.

Having described the invention, what is claimed as new is:

1. A wagon hitch comprising a clamp adapted to be mounted on a towing vehicle, a rigid attaching arm fixed to the clamp, a draw bar having forward and rear ends, the rear end of said draw bar having a notch therein to accommodate a pin of a wagon, a horizontally swingable hook member pivoted to the bar and extendable across the notch to lock a pin in the notch, a vertical coupling pin extending through the attaching arm and the forward end of the draw bar, an elongated actuating arm centrally pivoted to the attaching arm for horizontal swinging movement, a pitman having a forward end pivoted to one end of the actuating arm and having a rear end pivoted to the hook member, the pivot between the pitman and the actuating arm being vertically aligned with and spaced from the coupling pin whereby the hook member may be swung by the actuating arm and pitman regardless of the angular relationship between the draw bar and the attaching arm, and means on the clamp and connected to the actuating arm for imparting horizontal swing to the actuating arm.

2. In a farm implement having a rear transverse portion and a rearwardly extending tongue fixed to and extending rearwardly from said transverse portion, a wagon hitch with automatic coupling unit and lever releasing gear comprising a draft bar having forward and rear portions, a clamp engaging said transverse portion adjacent said tongue, a rigid attaching arm fixed at one end to the clamp, the other end of said arm overlying said tongue, a vertical pin extending downwardly through the forward portion of said bar and also extending downwardly through the arm and the tongue, the rear portion of said bar being provided with a V-shaped pin seat, a cam surfaced hook member pivoted to said bar forwardly of said pin seat and adapted to engage about a pin seated in said seat, means urging said hook member toward the apex of said seat with the cam surface of said hook member extending across the pin seat to be engaged by a pin entering the seat, a horizontally swingable member centrally pivoted to the arm, a pitman having a rear end pivoted to the hook member and a vertical pivot securing the forward end of the pitman to one end of the horizontally swingable member, said pivot being vertically aligned with the pin, whereby said hook member may be pivoted by movement of said arm regardless of the angular relation of said bar to said transverse portion.

3. In a farm implement having a rear transverse portion and a rearwardly extending tongue fixed to and extending rearwardly from said transverse portion, a wagon hitch with automatic coupling unit and lever releasing gear comprising a draft bar having forward and rear portions, a clamp engaging said transverse portion adjacent said tongue, a rigid attaching arm fixed at one end to the clamp, the other end of said arm overlying said tongue, a vertical pin extending downwardly through the forward portion of said bar and also extending downwardly through the arm and the tongue, the rear portion of said bar being provided with a V-shaped pin seat, a cam surfaced hook member pivoted to said bar forwardly of said pin seat and adapted to engage about a pin seated in said seat, means urging said hook member toward the apex of said seat with the cam surface of said hook member extending across the pin seat to be engaged by a pin entering the seat, a horizontally swingable member centrally pivoted to the arm, a pitman having a rear end pivoted to the hook member and a vertical pivot securing the forward end of the pitman to one end of the horizontally swingable member, said pivot being vertically aligned with the pin, whereby said hook member may be pivoted by movement of said arm regardless of the angular relation of said bar to said transverse portion, a plate secured to the undersurface of said bar and including a rear offset end portion that underlies the bar and which terminates in a V-shaped end that underlies said seat, said hook member being pivotally mounted between said bar and said offset end portion.

RAYMOND P. GRIGSBY.

References Cited in the file of this patent

UNITED STATES PATENTS

| Number | Name | Date |
|---|---|---|
| 677,332 | Bartholomew | July 2, 1901 |
| 755,850 | Crisler | Mar. 29, 1904 |
| 784,927 | Crisler | Mar. 14, 1905 |
| 860,763 | Olsen | July 23, 1907 |
| 1,491,637 | Schrum | Apr. 22, 1924 |
| 1,523,309 | Stewardson | Jan. 13, 1925 |
| 2,464,424 | Weldon et al. | Mar. 15, 1949 |